(12) United States Patent
Swanson

(10) Patent No.: US 6,571,916 B1
(45) Date of Patent: Jun. 3, 2003

(54) FULLY ADJUSTABLE HUNTING TREE STAND

(76) Inventor: Jason Kent Swanson, 614 S. Sycamore, N. Platte, NE (US) 69101

( * ) Notice: Subject to any disclaimer, the term of this patent is extended or adjusted under 35 U.S.C. 154(b) by 0 days.

(21) Appl. No.: 10/247,454

(22) Filed: Sep. 18, 2002

Related U.S. Application Data

(63) Continuation-in-part of application No. 09/602,943, filed on Jun. 26, 2000, now abandoned.

(51) Int. Cl.$^7$ .................................................. E04G 3/00
(52) U.S. Cl. ........................ 182/187; 182/136; 182/188; 108/152
(58) Field of Search ................................ 182/129, 135, 182/136, 152, 187, 188; 108/152; 248/230.8

(56) References Cited

U.S. PATENT DOCUMENTS

| | | | | |
|---|---|---|---|---|
| 4,069,891 A | * | 1/1978 | McClung | 182/187 |
| 4,150,733 A | * | 4/1979 | Plummer | 182/187 |
| 4,730,699 A | * | 3/1988 | Threlkeld | 182/187 |
| 5,355,974 A | * | 10/1994 | Miller | 182/187 |
| 5,439,074 A | * | 8/1995 | Trout et al. | 182/187 |
| 5,482,137 A | * | 1/1996 | McNeill | 182/187 |
| 5,518,083 A | * | 5/1996 | Blennert | 182/188 |
| 5,695,099 A | * | 12/1997 | Strum | 224/155 |
| 5,723,808 A | * | 3/1998 | Devall | 89/37.04 |
| 5,842,540 A | * | 12/1998 | Mancini, Jr. | 182/136 |
| 5,848,666 A | * | 12/1998 | Woodall et al. | 182/187 |
| RE36,276 E | * | 8/1999 | Smith | 182/187 |
| 6,325,174 B1 | * | 12/2001 | Lamar | 182/187 |
| 6,367,585 B1 | * | 4/2002 | Fast | 182/187 |

* cited by examiner

*Primary Examiner*—Bruce A. Lev

(57) ABSTRACT

A fully adjustable hunting tree stand comprising a mounting base; a support member; a seat; and a platform. The mounting base and the support member axially interconnect for independent rotation about a common axis. The platform attaches to the support member at an end thereof, with the seat attaching to the support member at an opposite end thereof. The mounting base attaches to a tree of any angle, being aligned in the same angular direction thereof. The support member adjustably rotates about the mounting base and is secured in a position, which enables the platform and the seat to achieve a leveled position, regardless of what angled position the mounting base is placed.

1 Claim, 8 Drawing Sheets

FULLY ADJUSTABLE HUNTING TREE STAND

CROSS REFERENCES TO RELATED APPLICATIONS

Figure 1:
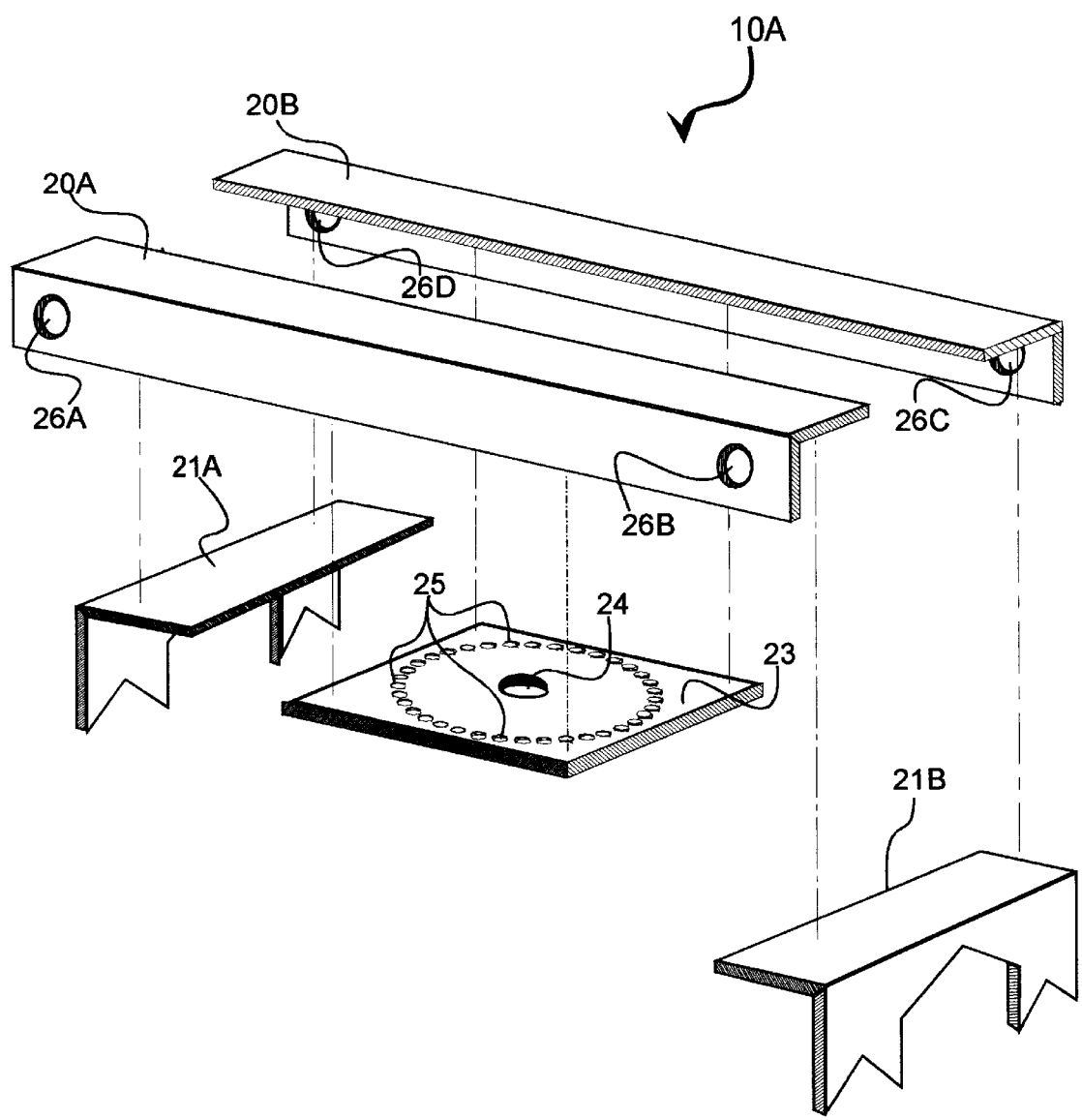

The enclosed application is a continuation-in-part of non-provisional application Ser. No. 09/602,943 filed Jun. 26, 2000, Now abandoned. Please replace the specification including the drawings and claims filed under application Ser. No. 09/602,943 with the enclosed application, as a continuation-in-part of application.

BACKGROUND OF THE INVENTION

A) Field of Invention

The present invention relates to portable hunting tree stands in general. The present invention is more specifically focused on providing a portable hunting stand, capable of attaching to any tree having any angle. Regardless of the tree's angle, the platform remains level with a seat positioned directly above and parallel to the platform.

B) Description of Prior Art

Tree stands provide a hunter with an elevated area in a tree to hunt and observe game animals. Among the different shapes, sizes and materials used, tree stands generally fall into three categories: a fixed position tree stand; a climbing tree stand; and a ladder stand. The disadvantages associated with these stands are commonly known amongst those who are skilled and have reasonable knowledge in the related field as well as those who have used any of today's tree stands. Each of the three categories aforementioned and the limited disadvantages these stands inherit, are described.

A fixed position stand comprises of a platform and a seating component. The platform connects to one end of a mounting bracket, with the seat connecting to opposite end. Different methods secure the stand to the tree in a substantially upright position. The platform is placed in a perpendicular orientation with respect to the mounting bracket being secured to the tree. The disadvantage of a fixed position tree stand is that it relies on a tree having vertical characteristics. Placing the mounting bracket in an upright position is necessary in order for the platform to achieve a horizontal, leveled position. If the mounting bracket is attached to a tree trunk that is not completely vertical then the platform of the stand will not be level. This then decreases the secured stability of attachment and creates a dangerous situation for the user. Until recently none of the prior art portable—fixed position tree stands were designed to be adjustable to the tree's angle. The tree stand shown in U.S. Pat. No. 6,367,585 B1 is one of very few adjustable hunting stand systems. Although the stand's platform and seat are adjustable, a number of disadvantages still exist with the stand shown in the aforementioned patent. Accordingly, the platform pivots about the lower end of the stand's support bracket, with the seat pivoting about the upper end, both are pivotally adjusted to accommodate the tree's angle. A disadvantage associated with this particular design is that the platform is pivoted towards the trunk of a tree. In order for the platform to achieve a horizontal position, the stand must be attached a minimum distance away from the trunk in order for the platform not to hit the trunk when pivoted into its usable position. And like all other fixed-position tree stands, the stand in the aforementioned patent is designed to resist vertical pressure only. No tree stand, with the ability to resist horizontal or sideways pressure, is available on today's tree stand market. This makes it difficult for the user to climb in and out of the stand without the stand moving when sideways pressure is applied. In further, the stand shown in the aforementioned patent is only adjustable to trees having an angle within 45-degrees.

A climbing tree stand uses a unique two piece design, which enables the user to climb a tree with the stand itself. The climbing stand ascends a tree trunk to a desired height. A disadvantage of the climbing tree stand is that the limbs protruding from the trunk that the stand is attached to, determine how high the stand can ascend the tree. Therefore, the climbing stand is limited to trees having a vertical tree trunk that is free of limbs. Very few trees are free of limbs at any given height along its trunk.

A ladder stand is a ladder with a platform attached to the end. The stand is leaned against the tree and secured thereon. Although, no other climbing device is necessary when using a ladder stand, the larger size and weight limits the ladder stands' flexibility and portability; thus, limiting the user to a defined area.

Because all of the above mentioned stands rely on a tree for attachment, limitations will surely be placed on such stands by any trees. The number of limbs on a tree, the size of the tree, and the angle of the tree must all be taken into consideration by the user of these stands when selecting a particular tree for attachment. Accordingly, no tree stand has been made available which has the ability to attach to a tree having any angle found within a 180-degree radius. In further, no tree stand is made available which has the ability to resist sideways pressure. The present invention provides a tree stand not subject to the described limitations; therefore, the user does not have to settle for a tree of second choice.

SUMMARY OF THE INVENTION

In view of the disadvantages associated with prior art tree stands, the present invention's objectives are listed. Such objectives are readily visible and of primary focus. The tree stand in accordance to the present invention also reduces and eliminates a number of problems that are individually viewed as a disadvantage with tree stands of prior art. Such advantages are individually based; therefore, not described herein. However, a broad list of objectives, in accordance to the present invention and the advantages associated therewith are as follows:

a) An object of the present invention provides a fully adjustable hunting tree stand attachable to a tree of any angle. The user may attach the stand to whatever angle so desired. A horizontal tree limb, a vertical tree trunk, and any angle in-between all provide an area the stand of the present invention can attach to, and still maintain a horizontal secured platform and seat.

b) An object of the present invention is to provide a tree stand that can be manufactured with less time and material, compared to some of today's marketed tree stands.

c) An object of the present invention is to provide a tree stand that is light weight and smaller in size; thus, being easily transported from one tree to another.

d) An object of the present invention is to provide a portable, fixed position tree stand that resists sideways pressure, making it safer to climb into and out of.

e) An object of the present invention is to provide a tree stand attachable to either side of a particular angled tree limb or trunk. Precise stand placement allows the hunter to place the stand in accordance to their dominant hand, i.e., either a right or left hand shooter. Such positioning is very important, especially in bow hunting. The hunter is able to draw back his or her bow, so that when at full draw he or she is immediately on target. As a result very little movement is required by the hunter when placing a shot on a particular game animal; thus, increasing the possibility of a successful harvest.

f) An object of the present invention is to provide a tree stand attachable to any portion of a tree limb; thereby, allowing the user to attach the stand at the very base of a limb adjacent the trunk which the limb protrudes from. Adjustable tree stands of prior art can only be attached to a portion of a limb that is at a fixed distance further along the limb and away from the trunk. This minimum space is required in order for the platform to extend out to its usable position without the trunk getting in the way.

The following information is a summary of the tree stand according to the present invention. The described components and their interconnection, along with the process used in making and using the tree stand of the present invention, should not be limited to such descriptive matter. Similar components can be used, altered and manipulated, along with their interconnection and functioning purposes to achieve the same benefits as set forth herein, staying within the scope of what is claimed and sought to have protected under the term patent.

The tree stand of the present invention comprises of a mounting base; a support member; a platform and a seat. A axle bar passes through a cross piece located on the mounting base. The axle bar passes through a portion of the support member; thus, axially connecting the mounting base and the support member so that the mounting base and the support member independently rotate about a common axis by means of the axle bar. The platform pivotally connects to the support member at end thereof. The seat pivotally connects to the support member at an opposite end thereof. The platform is placed in a horizontal orientation with respect to the support member being in an upright position; thereby, the platform is perpendicular to the support member when placed in a usable position. The seat is positioned parallel, and above the platform. A number of pre-drilled holes pass through the crosspiece of the mounting base. These holes are placed in a circular orientation, positioned a fixed distance from a point of axis. The axle bar passes through the crosspiece at the point of axis. A locking bolt, receivable in the outer facing side of an elongated bar, is part of the support member. The axle bar, as mentioned earlier, passes through a portion of the support member at a position on the elongated bar's non-exposed backside. The locking bolt is positioned on the elongated bar at a fixed distance that is equal to that of any one, and all of the pre-drilled holes positioned on the crosspiece. The locking bolt passes through a threaded hole located on the support member's elongated bar. The end portion of the locking bolt is tapered off having a circumference in size to penetrate and fit snugly into any one, and all of the pre-drilled holes on the crosspiece.

Using the Stand of the Present Invention

The mounting base attaches to a tree, aligned in the same angular direction thereon, so that the axle bar is aligned in a direction that is in a parallel plan with the platform; thereby, the axle bar passes through the mounting base and the support member at a right angle. The mounting base is secured to the tree with a pair of ratchet tie down straps hooked at opposite ends of the mounting base. An end portion of each strap hooks to the mounting base. The second end of each strap wraps around the tree, hooking to the mounting base on the opposite side of the strap's first end.

The support member (elongated bar) rotates about the mounting base in a parallel plan that is perpendicular to the axle bar. As the support member rotates the locking bolt's tapered end becomes aligned with any one of the multiple pre-drilled pin holes positioned on the mounting base's cross piece. Such alignment occurs at slight rotating intervals of degree completely around the 360 degree circle of rotation. The support member rotates about the mounting base, placed in a position that enables the platform and seat to become level. The locking bolt is tightened, so its tapered end penetrates the aligned pin hole; thus, stabilizing the support member for non-rotational movement.

The described components and their functioning purpose allow the stand in its entirety, to be attachable to a tree limb and a tree trunk of any angle and still maintain a horizontal secured platform and seat.

An alternative design for the present invention comprises of similar components as the embodiment described above. This alternative design however allows the support member to be removable from the mounting base. To achieve this the axle bar passes through the mounting base as previously described. However, instead of the axle bar being secured to the support member, it's fastened to a receiving bracket. The receiving bracket comprises of two threaded pegs protruding from its top surface at right angles. These pegs are positioned at separate ends of the receiving bracket. Two separate locking bolts pass through the top surface of the receiving bracket. The locking bolts pass through the receiving bracket at a position that enables the locking bolts to become aligned with any two of the pre-drilled holes located on the mounting base's cross piece. Such alignment occurs at slight rotating intervals of degree completely around the 360-degree circle of rotation. The locking bolts on the receiving bracket serve the same purpose as the locking bolt described in the first embodiment of the present invention.

The support member's alternative design comprises of two elongated bars positioned parallel to one another at a fixed distance apart. The two bars are connected by two separate crosspieces attached to the top surface of each of the two bars, spaced a fixed distance apart. A pre-drilled hole passes through each of the two crosspieces. These holes are positioned at the same distance to that of the threaded pegs located on the receiving bracket. Each pinhole receives a portion of the aligned threaded peg, so that a portion of each threaded peg, extends past the top surface of the two cross members of the support member. A wing nut or similar device is fastened to each of the threaded peg's exposed portion; thus, securing the support member to the receiving bracket. Similar to the first embodiment, a platform and a seat are attached to the support member at opposite ends thereof.

To use the tree stand of the present invention with the alternative embodiment is identical to that previously described in the first embodiment. The mounting base attaches to a tree, aligned in the same angular direction thereon. The support member is secured in a position to enable the platform and seat to achieve a horizontal orientation with respect to the secured position of the support member. The difference between the two embodiments is that the receiving bracket is stabilized for non-rotational movement by means of the two locking bolts wherein the support member is stabilized by a locking bolt in the first embodiment. The receiving bracket enables the support member to be removed from the mounting base.

DESCRIPTION OF THE SEVERAL DRAWING VIEWS

FIG. 1. An exploded view of the mounting base.

Figure 2:
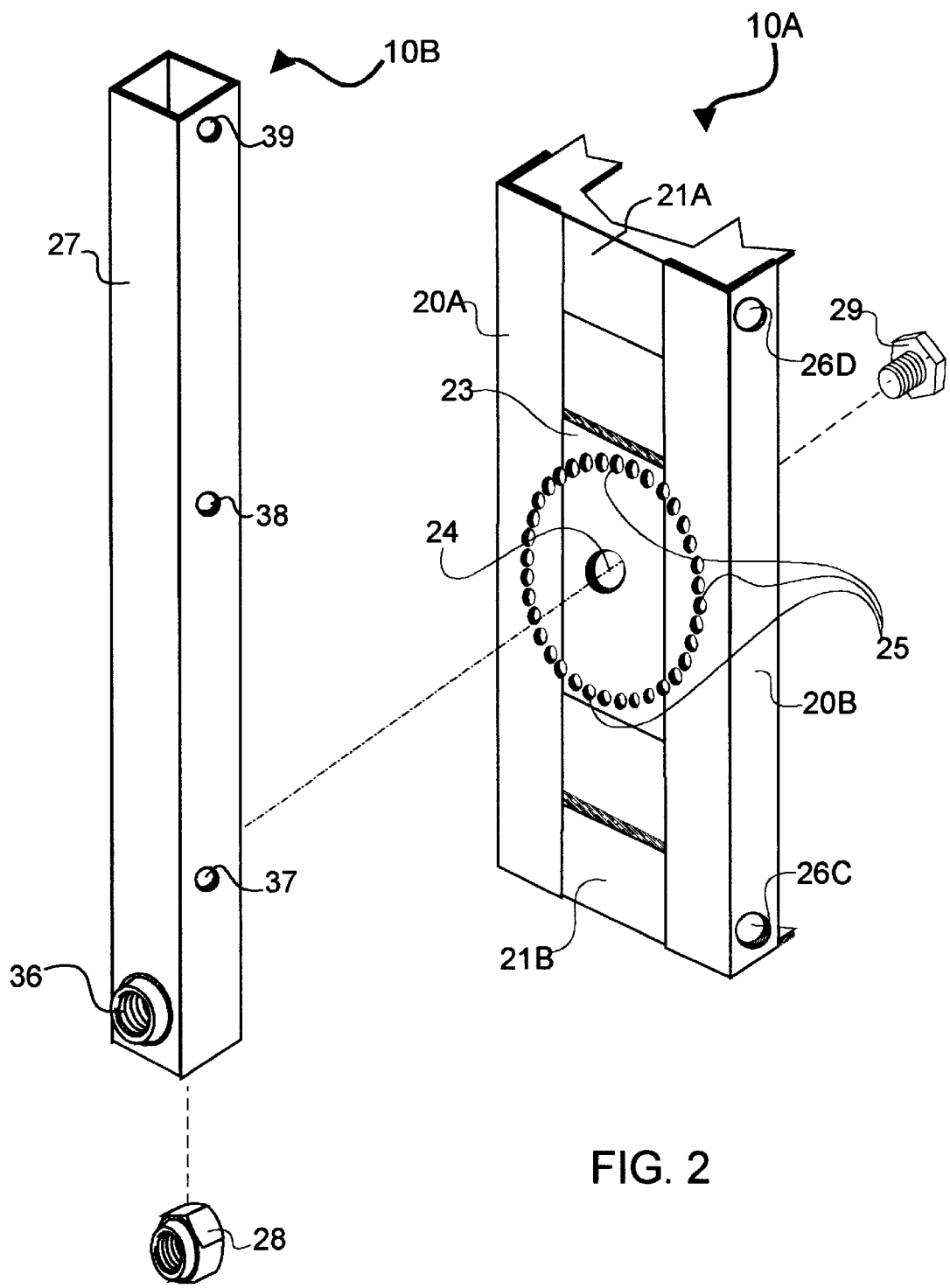

FIG. 2. A perspective view of mounting base and the support member to show interconnection.

Figure 3:
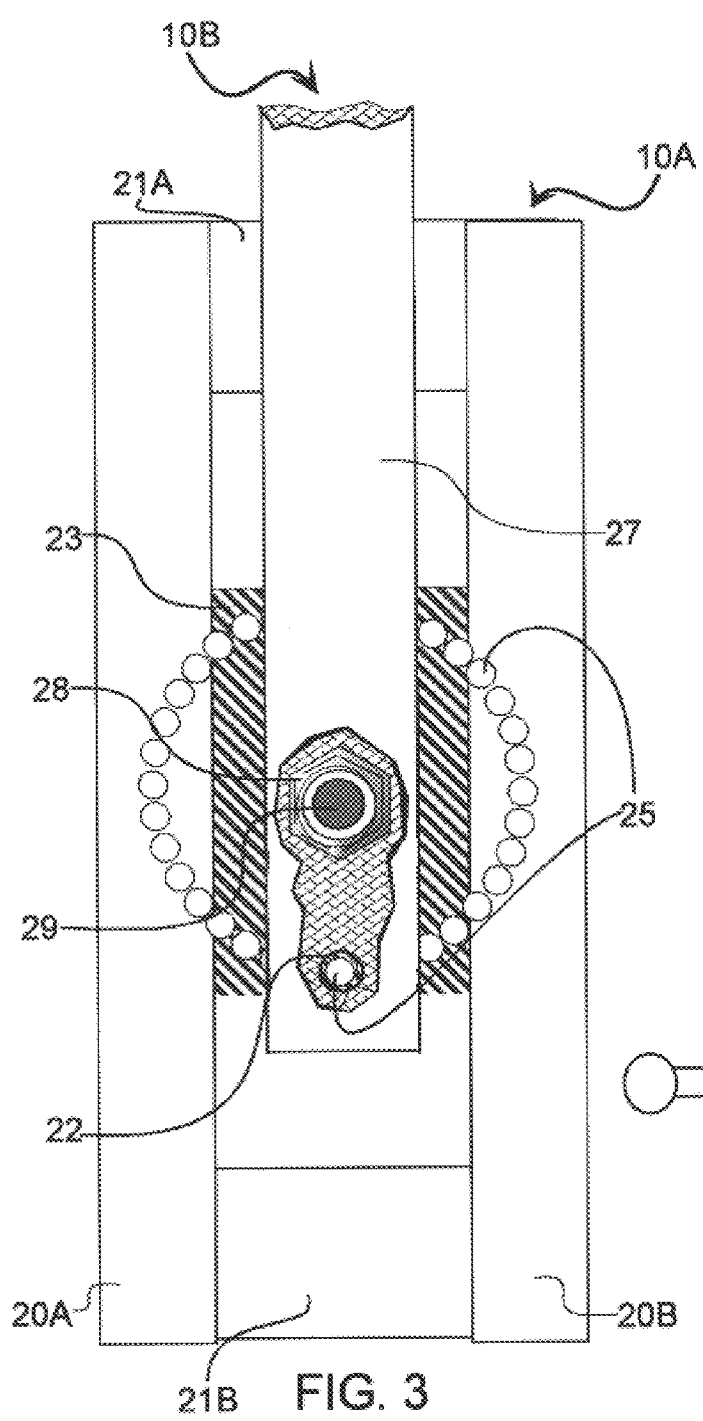

FIG. 3. A front plan view of the mounting base and a partial, broken away view of the support member.

Figure 4:
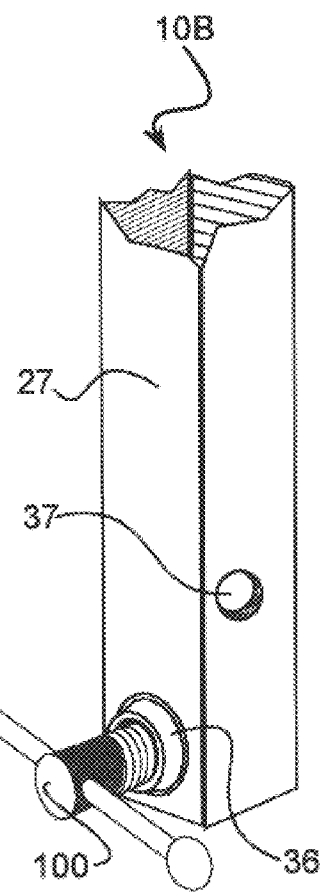

FIG. 4. An enlarged partial view of the support member's illustrating the locking bolt's position.

Figure 5:
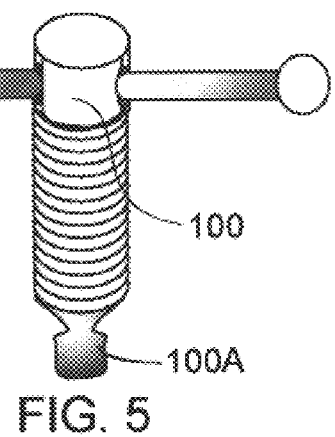

FIG. 5. A front plan view of the locking bolt.

Figure 6:
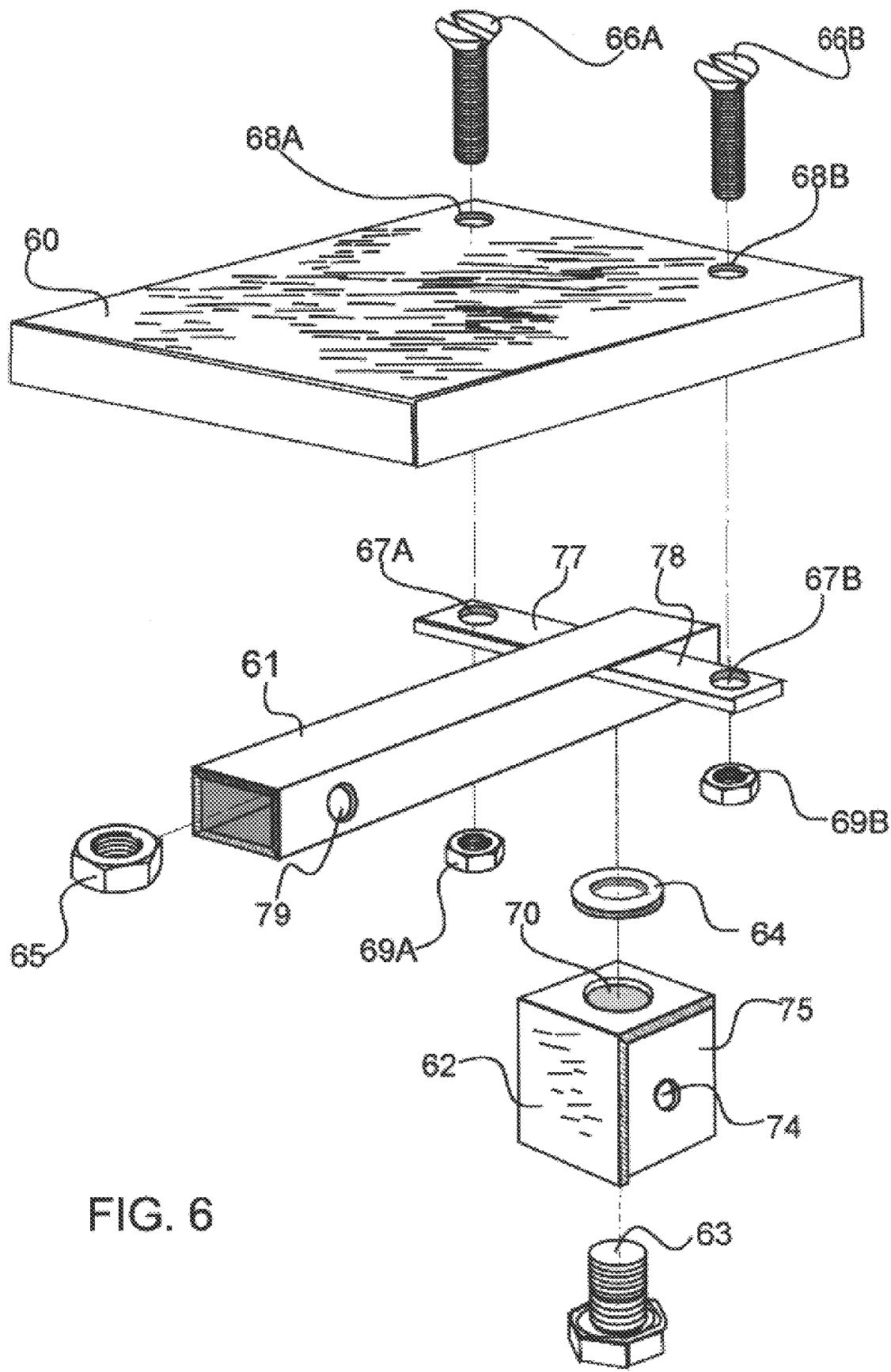

FIG. 6. An exploded view of the present invention's seat assembly.

Figure 7:
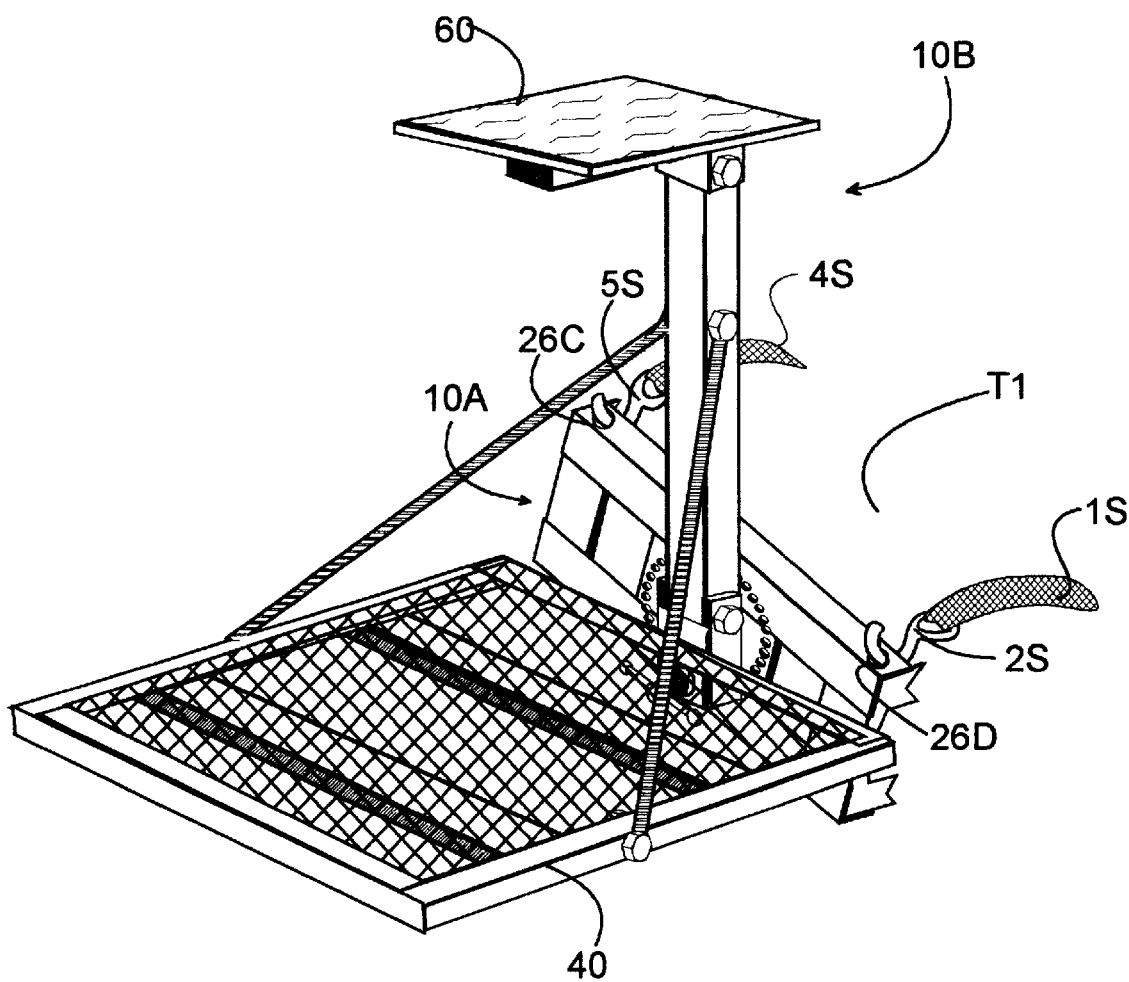

FIG. 7. A perspective view of the tree stand according to the present invention, illustrating its attachment to an angled tree limb.

Figure 8:
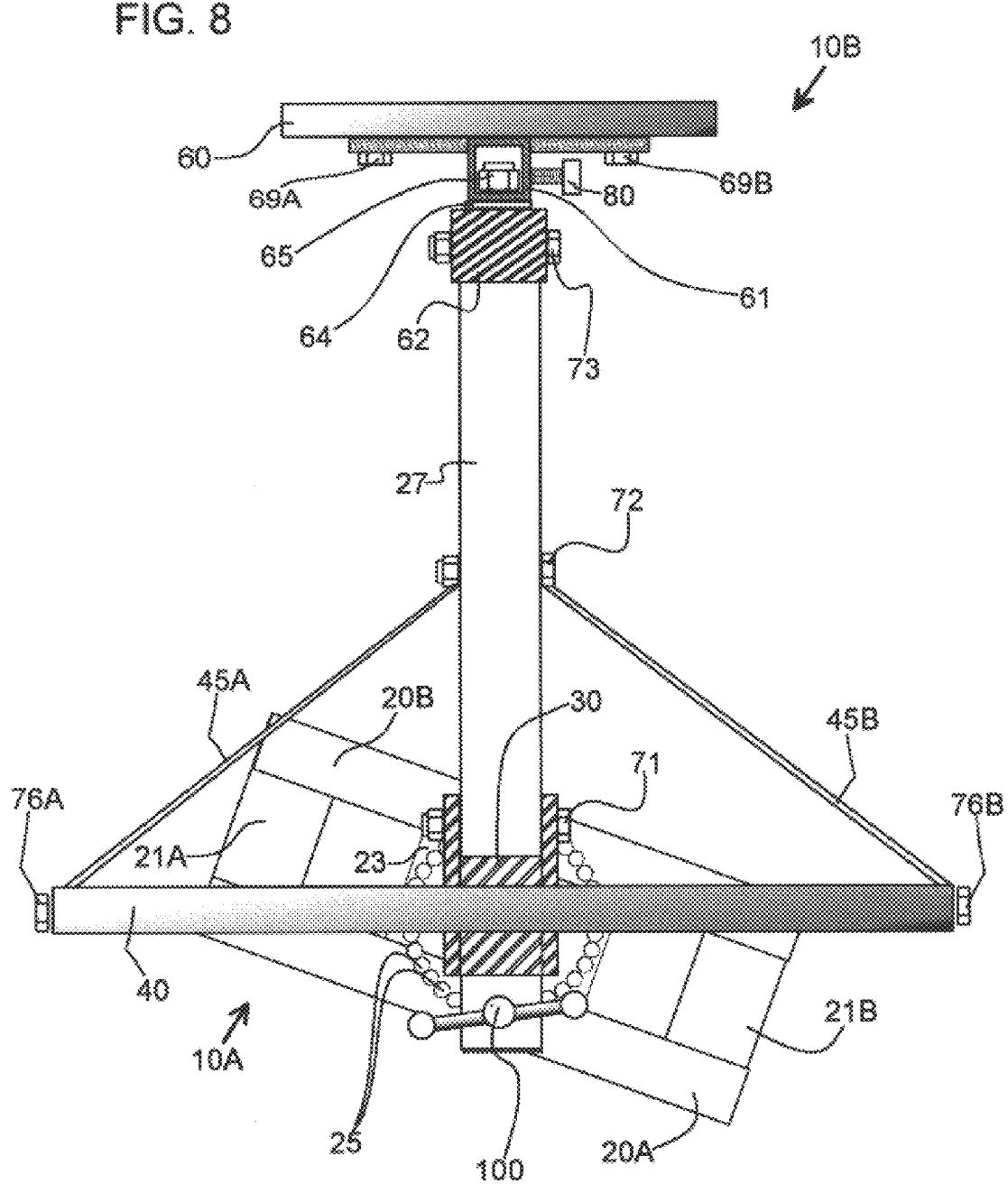

FIG. 8. A front plan view of the tree stand according to the present invention, illustrating all components completely assembled.

Figure 9:
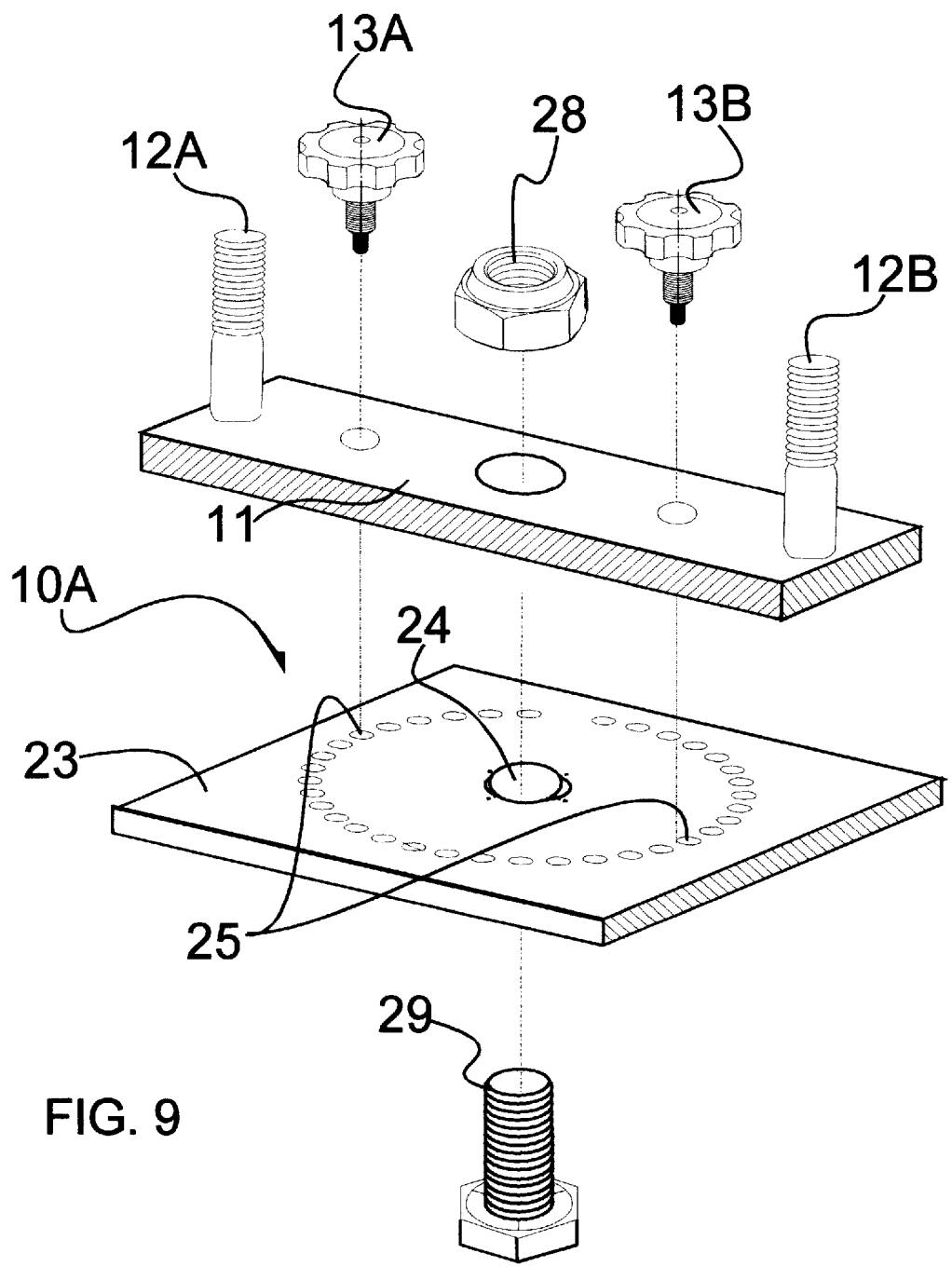

FIG. 9. An exploded view showing the receiving bracket's interconnection to a portion of the mounting base, according to an alternative embodiment.

Figure 10:
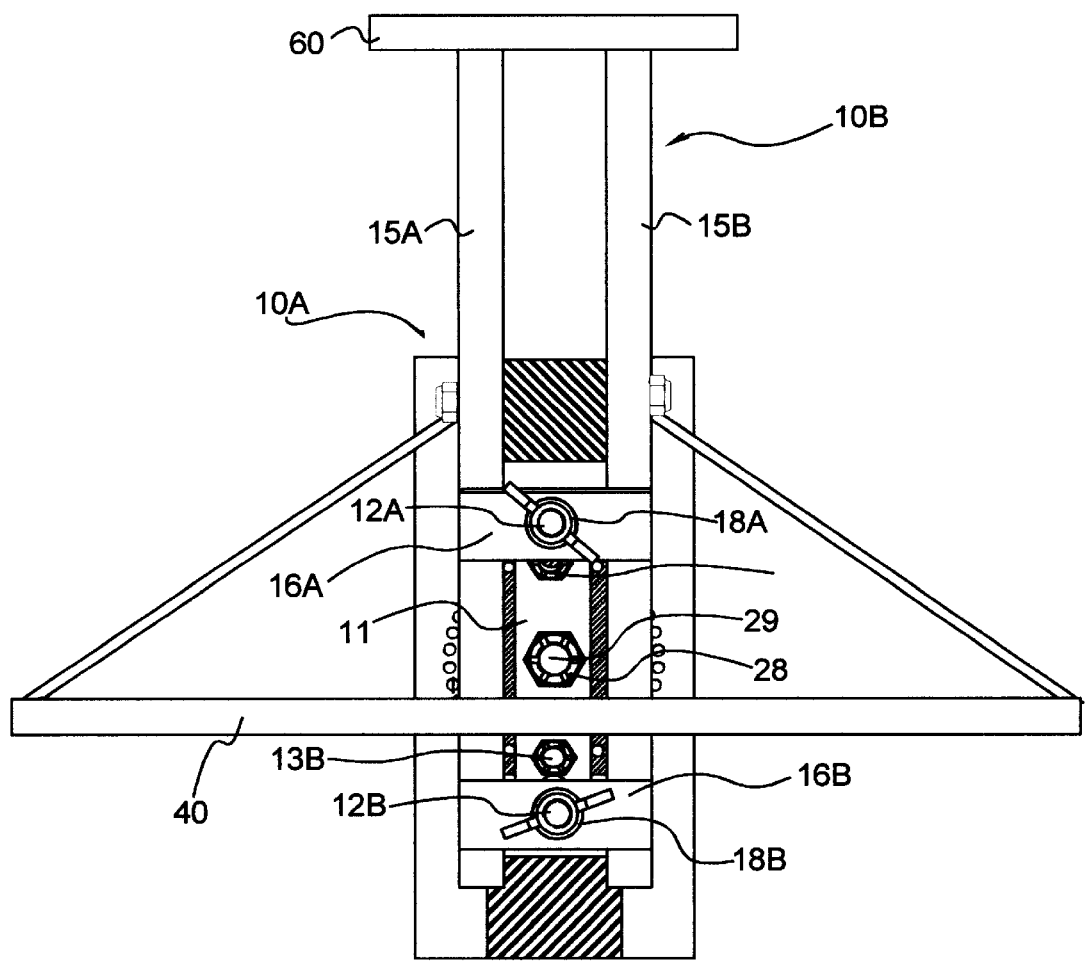

FIG. 10. A front plan view of the support member attached to the mounting base illustrating the support member's alternative embodiment.

DETAILED DESCRIPTION OF THE PREFERED EMBODIMENT

The present invention provides a fully adjustable hunting tree stand attachable to a tree of any angle. Be it a horizontal tree limb, a vertical tree trunk, or any angle in-between, the platform of the stand remains level. The seat achieves the same leveled-position, directly above and parallel to the platform.

To accomplish this, the present invention utilizes two supporting frame structures that connect axially, for independent rotation about a commons axis. For a clearer understanding, the supporting frames are referred to as a support member and a mounting base. The mounting base as a whole will be referred to as reference numeral 10A. The support member as a whole will be referred to as reference numeral 10B. Numerals 10A and 10B will be used throughout the detailed description of the preferred embodiment.

Referring to FIG. 1 which illustrates the mounting base 10A in an exploded view. Mounting base 10A comprises of two elongated angled pieces 20A and 20B, which are constructed of either iron or aluminum. For clarity, angled piece 20A and angled piece 20B will be referred to as angle iron. Angle iron 20A is positioned parallel to angle iron 20B. Angle iron 20A and angle iron 20B are spaced a fixed distance apart, so that angle iron 20A and angle iron 20B's outside edges face outward and upward. Cross member 21A (preferably made of angle iron or angle aluminum) connects to angle iron 20A and angle iron 20B at an end thereof. Cross member 21B (preferably made of angle iron or angle aluminum, also) connects to angle iron 20A and angle iron 20B's opposite end. Cross member 21A attaches to angle iron 20A and angle iron 20B's inside angle crosswise. Cross member 21 B attaches to angle iron 20A and angle iron 20B's inside angle crosswise and at the opposite end of cross member 21A. Both cross member 21A and 21B have a triangular shaped bottom straight edge, which is relatively sharp in order for the mounting base 10A to penetrate the bark of a tree. Cross member 21A, cross member 21B, angle iron 20A, and angle iron 20B when connected, resemble a rectangular shaped frame. A squared shaped cross member 23 (preferably made of flat iron or aluminum) connects to angle iron 20A and angle iron 20B's inside angle at a position in-between cross member 21A and cross member 21B. Cross member 23 comprises of a central hole 24, which passes through cross member 23's center. A number of pre-drilled holes 25 pass through cross member 23. Holes 25 are arranged in a circular path around the outer parameter of cross member 23. Holes 25 are positioned at a fixed radius from hole 24.

Four separate pre-drilled holes 26A, 26B, 26C, and 26D pass through the outside edges of angle iron 20A and angle iron 20B, at opposite ends thereof. Hole 26A and hole 26B passing through angle iron 20A's outside edge, with hole 26C and hole 26D passing through angle iron 20B's outside edge.

Referring to FIG. 2. A certain number of holes 25 pass through the upward facing edge of angle iron 20A and angle iron 20B. Mounting base 10A attaches to a portion of support member 10B by an axle rod passing through hole 24 and partially through a portion of square tubing 27.

Referring to FIG. 3. Fastener 28 is placed inside square tubing 27, so that the Axle rod 29 is received by fastener 28; thus, axially attaching square tubing 27 of the support member 10B with the mounting base 10A. A pre-drilled hole 22 passes through square tubing 27's non-exposed side. Hole 22 passes through square tubing 27 at a position equal in distance to that set by the radial distance between holes 25 from hole 24. Thereby, hole 22 aligns with any one of holes 25 when square tubing 27 is rotated about the axle rod 29 and the mounting base 10A.

Referring to FIG. 4. A threaded hole 36 passes through square tubing 27 and aligned with hole 22. Locking bolt is received by threaded hole 36, enabling locking bolt 100 to be tightened or loosened. Shown in FIG. 5 is locking bolt 100, having a tapered end 100A. The tampered end 100A's diameter enables it to pass through hole 22 and into any of holes 25 when locking bolt 100 is tightened; thus, locking bolt 100 serves to stabilize square tubing 27 of the support member 10B for non-rotational movement at multiple locations completely around the 360 degree circle of rotation. There is a total of thirty-six holes being referred to as reference numeral 25. Hole 22 becomes aligned with one of holes 25 at least every 10-degrees.

Referring to FIG. 8. Platform 40 and seat 60 are pivotally connected to square tubing 27. Piece 30 attaches to the backside of platform 40. Piece 30 is constructed of either aluminum or metal. A front upper portion of piece 30 is removed in order to allow square tubing 27 to pivot about piece 30 and into a parallel position with platform 40. Bolt 71 passes through piece 30 and square tubing 27. Piece 30 extends past the bottom surface of platform 40. This ensures platform 40 doesn't go beyond a 90-degree angle to square tubing 27 when platform 40 is folded downward and away from square tubing 27, into a usable position. Cable 45A and cable 45B give platform 40 extra support when weight is applied to platform 40. Bolt 72 passes through one end of cable 45B traveling through square tubing 27 and through one end of cable 45A. Bolt 76A passes through cable 45A's second end and through a side portion of platform 40. Bolt 76B passes through cable 45B's second end and through a side portion of platform 40, opposite to the side of bolt 76A. Mounting base 10A is shown in an angled position relative to the support member 10B; whereby square tubing 27 is in a vertical position. The vertical position of square tubing 27 enables the platform 40 and the seat 60 to achieve a horizontal position. Locking bolt 100 stabilizes square tubing 27 in the vertical position; thereby, securing the platform 40 and the seat 60 in a usable horizontal position.

Referring to FIG. 6. The seat assembly comprises of piece 62, which s a piece of angled aluminum or angle iron, with a side piece 75 attached to piece 62's inside angle. A second side piece (not shown) attaches to piece 62, opposite of piece 75. A pre-drilled hole 70 passes through the top facing side of piece 62. A portion of bolt 63 passes through hole 70 and through a washer 64. Bolt 63 is then placed through the under side of square tubing 61. Square tubing 61 is secured to piece 62 by bolt 63 being fastened by lock nut 65, which is placed inside square tubing 61. Seat 60 attaches to square tubing 61 by bolt 66A passing through a top portion of seat 60, being inserted into hole 68A and then passing through hole 67A, and fastened by nut 69A. Hole 67A passes through a flat shaped piece 77. Piece 77 attaches to a side portion of square tubing 61. Piece 78 being attached to the opposite side portion of square tubing 61. Bolt 66B passes through hole 68B, through hole 67B and fastened by nut 69B.

Referring to FIG. 8. An end portion of square tubing is left exposed at a central position directly below seat 60. The tubular opening can be used to receive a second piece of square tubing (not shown) which can come with a number of helpful accessories (also not shown). Such as a bow holder, a support arm for a camera or video, a drink holder, etc. etc. The receivable portion of square tubing 61 would be able to accept any of the above accessories; with little or no effort at all. Allowing the user to quickly use and replace any type of accessories as desired. A threaded hole 79 can be placed along a side portion of square tubing 61, as shown in FIG. 6. Hole 79 receives a thumbscrew 80, shown in FIG. 8. Thumbscrew 80 can be tightened to secure the second piece of square tubing (not shown) and the attached accessories. To remove or replace the accessories, simply loosen thumbscrew 80.

Referring to FIG. 7. The mounting base 10A attaches to a tree (shown attached to an angled tree limb) with ratchet tie down strap 1S and ratchet tie down strap 4S. Strap 1S connects to the mounting base 10A by a hook 2S passing through hole 26D. Strap 1S wraps around the tree limb T1 with its second end (not shown) connecting to hole 26A (shown in FIG. 1). Strap 4S connects to mounting base 10A by a hook 5S of passing through hole 26C. Strap 4S wraps around the tree limb T1 with its second end (not shown) connecting to hole 26B (shown in FIG. 1).

Referring to FIG. 9. An alternative embodiment of the present invention comprises of a receiving bracket 11. Receiving bracket 11 connects axially to the mounting base 10A with the axle bar 29 passing through hole 24 on cross piece 23. Axle bar 29 passes through the receiving bracket 11 and fastened thereon by fastener 28. Locking bolt 13A and locking bolt 13B pass through receiving bracket 11 at a position that allows locking bolt 13A and 13B to become aligned with holes 25 on cross member 23. Such alignment occurs at slight rotating intervals completely around the 360-degree circle of rotation. A threaded peg 12A is attached to the receiving bracket 11 at a right angle, positioned at an end thereof. Threaded peg 12B is attached to receiving bracket 11 at an opposite end thereof, also at a right angle.

Referring to FIG. 10. An alternative embodiment for the support member of the present invention comprises of an elongated bar 15A, which is connected to a second elongated bar 15B by cross member 16A and cross member 16B. Cross member 16A and cross member 16B are attached to the front facing side of bar 15A and 15B, spaced a fixed distance apart. Receiving bracket 11 receives support member 10B with threaded peg 12A passing through cross member 16A. Wing nut 18A screws onto threaded peg 12A,s exposed end. Threaded peg 12B passes through cross member 16B. Wing nut 18B screws onto threaded peg 12B's exposed end. Platform 40 and seat 60 are attached to support member 10B by a variety of means. Such attachment will be apparent to those skilled in the art, with which the present invention pertains.

What is claimed is:

1. Fully adjustable hunting tree stand comprising:

a mounting base;

a support member having a first end and a second end;

a seat attaches to said first end;

a platform attaches to said second end;

an axle bar passes through said mounting base; and through a portion of said support member; thus, axially connecting said mounting base with said support member; whereby, said mounting base and said support member independently rotate about said axle bar;

means for attaching said mounting base to a tree; wherein the mounting base is aligned in the same angular direction of said tree;

said axle bar becomes aligned in a parallel plan with said platform; so that said support member rotates in a parallel plan that is perpendicular to the axle bar;

with respect to said mounting base being attached to said tree;

means for stabilizing said support member for non-rotational movement at multiple locations along the 360-degree circle of rotation; wherein said support member is stabilized in a position that enables said platform to achieve a horizontal position; said seat achieves the same horizontal position and directly above said platform.

* * * * *